United States Patent [19]
Hardin et al.

[11] 4,322,388
[45] Mar. 30, 1982

[54] CATALYTIC CONVERTER ASSEMBLY

[75] Inventors: Leonard J. Hardin, Franklin; Charles D. Shepherd, Columbus, both of Ind.

[73] Assignee: Arvin Industries, Inc., Columbus, Ind.

[21] Appl. No.: 215,178

[22] Filed: Dec. 11, 1980

Related U.S. Application Data

[63] Continuation of Ser. No. 97,362, Nov. 26, 1979, abandoned.

[51] Int. Cl.³ .......................... F01N 3/28; F01N 7/18
[52] U.S. Cl. ..................................... 422/177; 422/180
[58] Field of Search ............... 55/DIG. 30; 422/177, 422/179, 180; 60/299; 181/243, 282; 29/157 R, 463

[56] References Cited

U.S. PATENT DOCUMENTS

| | | | |
|---|---|---|---|
| 3,227,241 | 1/1966 | Mattoon | 55/DIG. 30 |
| 3,958,312 | 5/1976 | Weaving et al. | 422/180 |
| 4,020,539 | 5/1977 | Vroman | 60/299 |
| 4,109,752 | 8/1978 | Ferralli | 181/282 |
| 4,215,093 | 7/1980 | Yasuda | 422/180 |
| 4,235,846 | 11/1980 | Abthoff et al. | 422/180 |

*Primary Examiner*—Bradley Garris
*Attorney, Agent, or Firm*—Jenkins, Coffey, Hyland, Badger & Conard

[57] ABSTRACT

An assembly for a catalytic converter includes a housing and a catalyst-supporting substrate, or monolith. The housing includes upper and lower halves. One of the housing halves includes an enlarged perimetrally extending lip region. The other housing half includes a perimetrally extending insertion portion for insertion into engagement with the lip region. The housing halves are compression-loaded one within the other to either a predetermined force or a predetermined depth of insertion. This shoebox-like assembly is fabricated by supporting the lower housing half on a perimetrally extending ridge formed in the lower housing half and applying force to a perimetrally extending ridge formed in the upper housing half until the predetermined force has been reached or the insertion portion has reached a predetermined depth of insertion within the lip region. The assembly is compact and utilizes a minimum of space on a vehicle.

5 Claims, 8 Drawing Figures

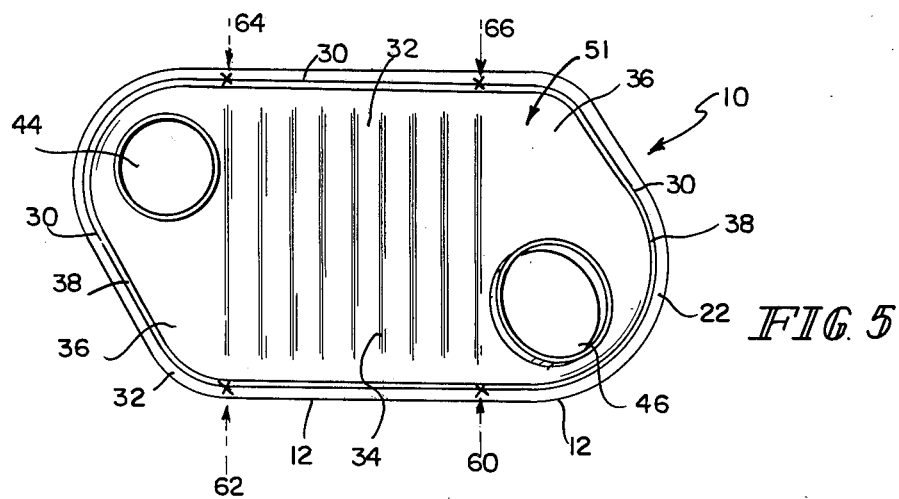
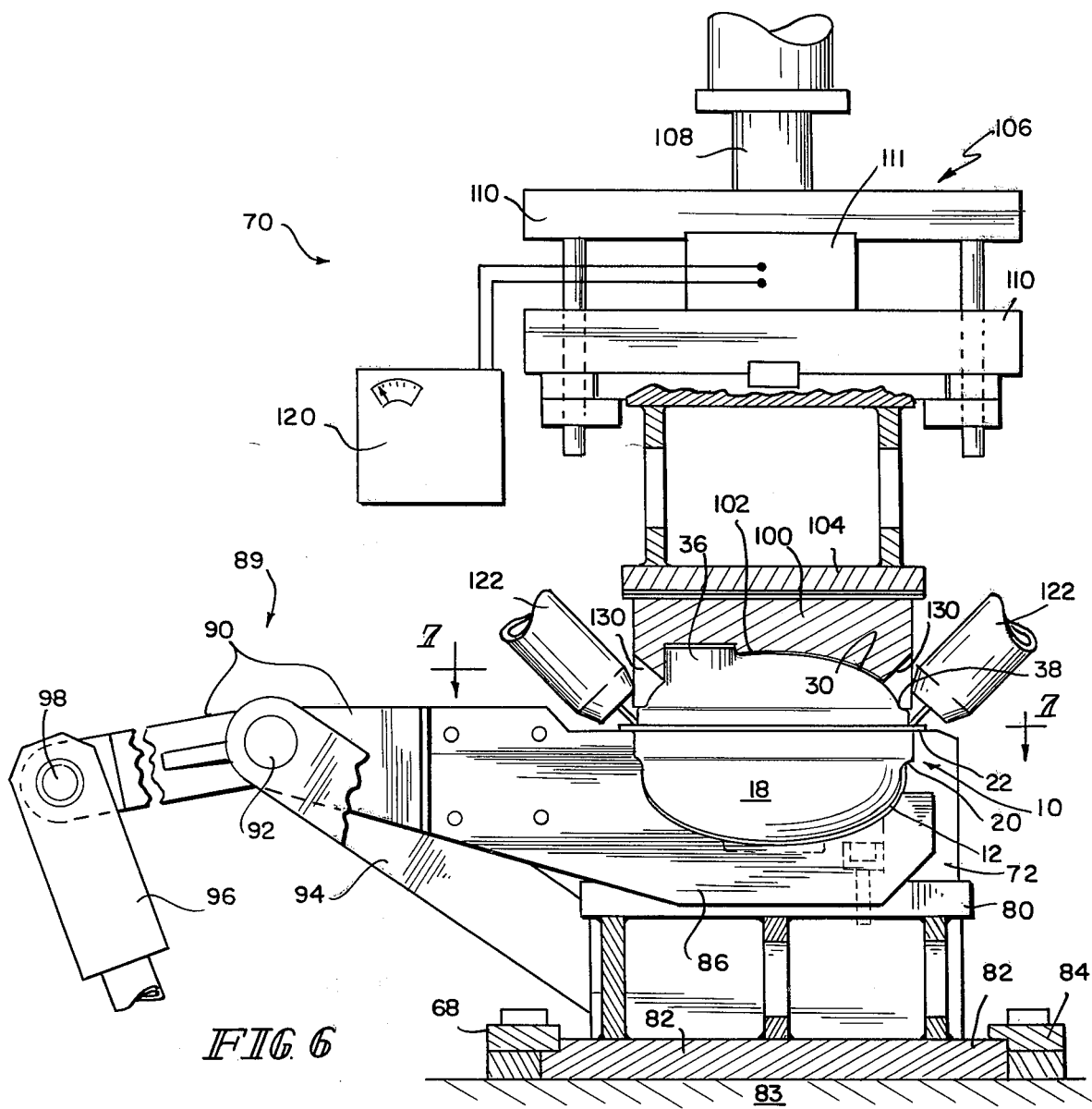

CATALYTIC CONVERTER ASSEMBLY

This is a continuation of application Ser. No. 097,362, filed Nov. 26, 1979, now abandoned.

The present invention relates to catalytic converters for vehicle exhaust systems and to an improved catalytic converter assembly and a method for fabricating it.

Many known types of catalytic converters have included upper and lower housing halves. Each of the housing halves has typically included a flange formed around its outer edge so that the two housings could be mated and the flanges welded together to form a complete assembly. This flange type of construction has lent itself to the use of electron beam welding or seam welding production techniques.

Because the converter catalyst must be heated to a fairly high temperature and maintained at this temperature for effective catalysis, it is desirable to locate the catalytic converter assembly closer to the engine, e.g., in the engine compartment of a vehicle. Accordingly, the size of the catalytic converter has become critically important. The converter assembly can be reduced in overall dimensions if the flanges can be removed from the assembly. This facilitates placement of the converter within the engine compartment.

In accordance with the present invention, a converter assembly and a method for fabricating the assembly are provided which accomplish the objective of reducing the size of the converter assembly by eliminating the flanges.

It is a further object to construct a converter assembly wherein the two housing halves are connected by a method that does not require flanges.

It is another object of the present invention to provide a catalytic converter assembly and a method of assembly in which one housing half is loaded within the other housing half to a predetermined force.

It is a further object of the present invention to provide a catalytic converter assembly and method of assembly in which one housing half is loaded within the other housing half to a predetermined depth of insertion.

With the above-mentioned inventive assemblies and methods, perimetrally extending ridges are formed in the housing halves for supporting the housing halves during the fabrication process, and for applying the necessary force to the housing halves to load one housing half within the other housing half either to the predetermined force or the predetermined depth.

A method of fabricating the catalytic converter assembly of the present invention includes the steps of supporting the lower housing half and a catalyst-supporting substrate, or monolith, loading the upper housing half within the lower housing half to either a predetermined force or a predetermined depth of insertion to contain the monoloith and joining the upper and lower housing halves to each other using a metal inert gas (MIG) spot weld. Typically, the monolith is placed in a support sleeve or mat mount before being inserted into the lower housing half. The sleeve acts as a pressure-absorbing medium between the housing halves and the catalyst during fabrication to protect the brittle monolith. In many converters, the sleeve also helps to seal the monolith to the converter housing against blow-by of unreacted exhaust gas.

Other features and advantages of the present invention will be apparent from the following detailed description of an embodiment thereof, and the accompanying drawings which illustrate the invention.

In the drawings:

FIG. 5 is a top plan view of the assembly of FIG. 1, illustrating a fabrication step;

FIG. 6 is a fragmentary and partly sectional view of an apparatus for fabricating the assembly shown in FIG. 1;

Figure 1:
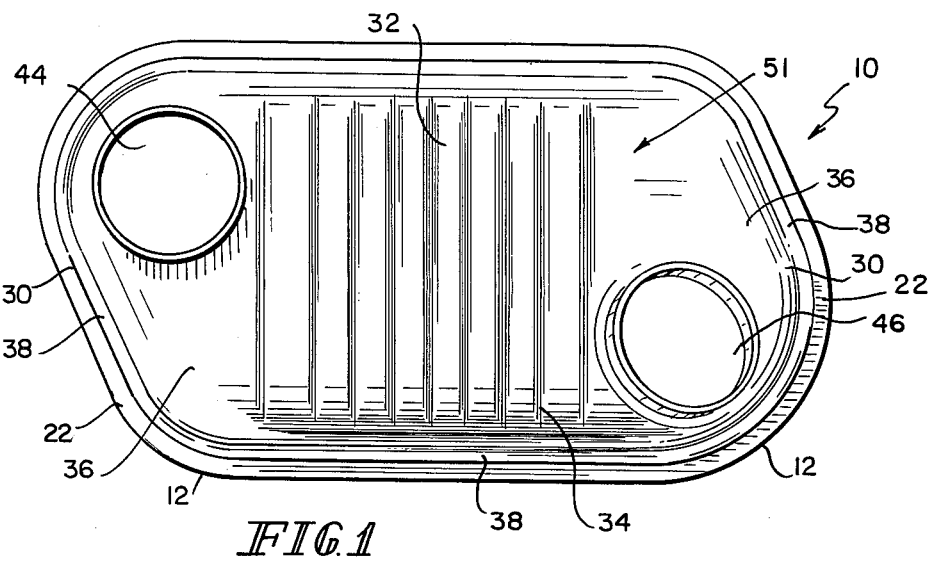
FIG. 1 is a top plan view of a catalytic converter assembly constructed in accordance with the present invention.

As previously discussed, automobile manufacturers have found it desirable to locate catalytic converter assemblies closer to the engines. Because of conventional methods of fabricating catalytic converter assemblies, the assemblies have included protruding flanges which add to overall size of the assemblies. These flanges consumed space and have rendered it difficult to relocate converter assemblies closer to the vehicle engines because of the limited space available in engine compartments. The upper and lower halves of converter assembly housings have previously been welded to each other utilizing the flanges.

The assembly and method of the present invention use a technique which can be likened to a shoebox. In this assembly and method, the upper housing half is loaded within the lower housing half to either a predetermined force or predetermined depth of insertion.

Referring now to FIGS. 1-4, a catalytic converter assembly 10 of the present invention is constructed of chromium steel having a thickness of approximately 0.055 inch (1.4 mm). The assembly 10 includes a lower housing half 12 having a portion 14 provided with grooves 16. Grooved portion 14 separates two end ungrooved portions 18. The grooves 16 are formed circumferentially of the lower housing half 12.

The lower housing half 12 further includes a perimetrally extending ridge 20 formed completely around and slightly below an upper, outwardly projecting edge 21 of the lower housing half 12. The ridge 20 aids in supporting the lower housing half 12 during the fabrication of the assembly 10 in a manner which will be described in more detail. An out-turned perimetral lip 22 is formed in the lower housing half 12 between ridge 20 and edge 21. Lip 22 has a width measured from the outside surface of the lower housing half 12 of approximately 0.187 inch (4.75 mm). This small annular lip 22 is the only protrusion from assembly 10.

Figure 4:
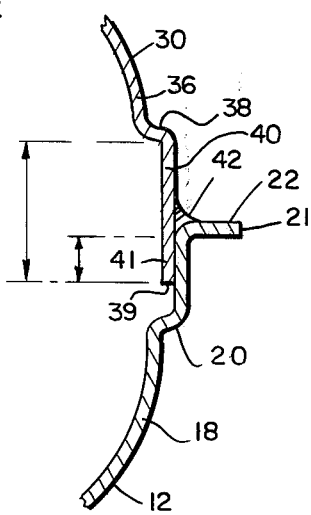
FIG. 4 is an enlarged sectional view of a detail of the assembly of FIG. 3.

Assembly 10 further includes an upper housing half 30 having a grooved portion 32 which coincides in position with the grooved portion 14 of the lower housing half 12 when the two housing halves 12, 30 are joined to form the assembly 10. The grooved portion 32 includes grooves 34 which are formed to extend circumferentially of the upper housing half 30 and which coincide in alignment with the grooves 16 formed in the lower housing half 12. Ungrooved portions 36 are provided at the ends of upper housing half 30. A perimetrally extending ridge 38 is formed completely around and slightly above the edge 39 of the upper housing half 30, as best illustrated in FIG. 4. Ridge 38 is used in a manner to be described for applying force to the upper housing half 30 to load the upper housing half 30 within the lower housing half 12. A planar edge section 40 is formed directly below the annular ridge 38 of the upper housing 30. Planar edge section 40 has a length of approximately 0.467 inch (11.86 mm) for engaging the inside of the lower housing half 12 between ridge 20 and lip 22. In one embodiment, a portion 41 of planar section 40 engages the lower housing half 12 at a depth of approximately 0.125 inch (3.17 mm). The amount of surface of the planar section 40 which engages the lower housing half 12, when a monolith provided with a support sleeve is positioned between the halves 12, 30, will be determined by the force applied to the upper housing half 30 to load the upper housing half 30 within the lower housing half 12. When the upper housing half 30 has been loaded into the lower housing half 12 to either the desired force or the desired depth, the two housings are connected by a metal inert gas (MIG) weld 42, as best illustrated in FIG. 4. The lip 22 need have only a sufficient width to provide a surface adjacent the edge 21 of the lower housing half 12 to retain the weld deposit 42 in the crevice formed between the planar section 40 of the upper housing half 30 and lip 22 of the lower housing half 12. Accordingly, the annular lip 22 can assume any shape desired to keep the overall dimensions of the assembly 10 to a minimum while also providing a means for retaining the weld deposit 42.

Figure 2:
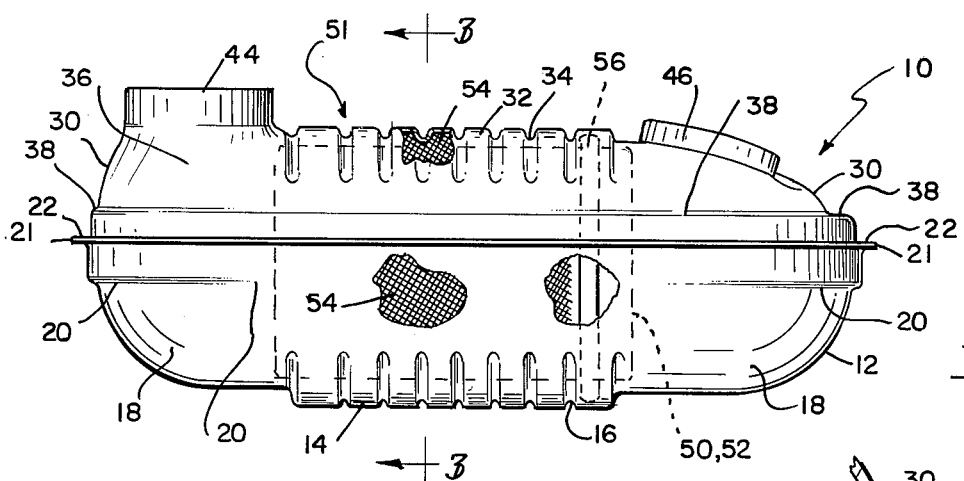
FIG. 2 is a side elevational view of the assembly of FIG. 1 illustrating the general relationship of its various components.
Figure 3:
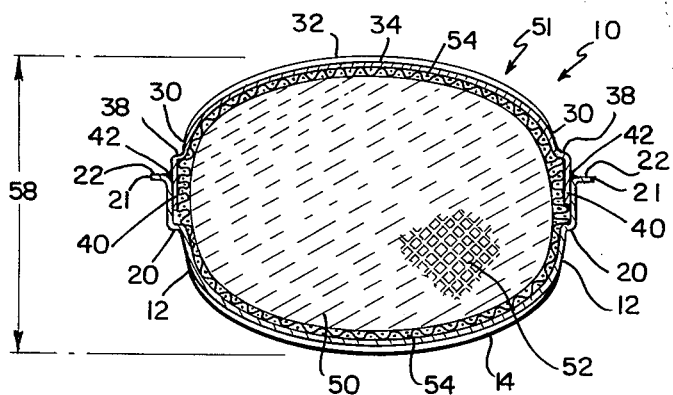
FIG. 3 is a sectional view of the assembly of FIGS. 1-3, taken generally along section lines 3—3 of FIG. 2.

As illustrated in FIGS. 1-2, the upper housing half 30 includes an exhaust gas inlet port 44 and an exhaust gas outlet port 46. The configuration of the assembly 10 is for illustrative purposes only. The inlet and outlet exhaust ports 44, 46 can both be formed in the lower housing half 12 or one may be formed in the upper housing half 30 and the other in the lower housing half 12. Furthermore, the shape of the overall assembly 10 can be different from that illustrated without departing from the scope of the present invention.

A monolith 50 supporting a catalyst for the exhaust gas is mounted within the housing 51 provided by the joined housing halves 12, 30. Monolith 50 provides a plurality of uniformly shaped openings 52 so that the exhaust gas can enter through the inlet port 44, pass through the monolith 50, and be exposed to the catalyst for reaction, and exit through the outlet port 46 of the assembly 10. As best illustrated in FIG. 2, the monolith 50 is positioned securely in the housing 51 between the grooved portions 14, 32. A support sleeve or mat mount 54 is positioned over the monolith 50 before the monolith 50 is positioned in the lower housing half 12, and the upper housing half 30 and lower housing half 12 are force-loaded into engagement. Support sleeve 54 illustratively is constructed from four-strand wire having a thickness of approximately 0.044 inch (1.12 mm). During the loading of the upper housing half 30 within the lower housing half 12, the support sleeve 54 absorbs some of the force being applied to the housing halves 12, 30, and therefore provides flexibility to avoid destroying the brittle monolith 50. As illustrated in FIG. 2, the support sleeve 54 will be compressed considerably when force is applied to the upper housing half 30. A sealing ring 56 can also be positioned around the monolith 50 to prevent exhaust gas from bypassing the catalyst on monolith 50 through the sleeve 54.

Loading, either to a preselected range of forces or to a preselected range of depths of insertion, is necessary to prevent such bypassing, often called "blow-by", as well as to secure the monolith against shifting in the housing 51. Such shifting can otherwise result from the pressure differential established across the monolith under operating conditions. Shifting of the monolith toward the downstream end of the housing under operating conditions is frequently referred to as "chucking."

As an example of the forces applied to the upper housing half 30 and the total cross-sectional dimension 58 (FIG. 3) of the assembly 10 that results from the application of such forces, the following information is provided. For a converter assembly 10 having a volume of 66 cubic inches (1081.55 cc), a force ranging from 2,800 pounds (1931.3 nt.) to 5,700 pounds (3931.6 nt.) provides a range of cross-section dimensions 58 of between 3.625 inches (9.2 cm) and 3.950 inches (10.03 cm). For a converter assembly having a volume of 75 cubic inches (1229 cc), a force in the range of 2,000 pounds (1379.5 nt.) to 6,300 pounds (4345.43 nt.) provides a range of cross-section dimensions 58 of between 3.500 inches (8.89 cm) and 3.91 inches (9.93 cm). Applying a greater force than the maxima indicated above to the specific structure whose dimensions have been provided may result in the destruction of the monolith 50. Applying less force than the minima indicated above to the structure whose dimensions have been provided may result in a cross-section dimension which is unacceptable for the application desired. Accordingly, it is critical during the fabrication process of the converter assembly 10 that the forces applied to the upper housing half 30 and lower housing half 12 be continuously monitored and the upper and lower housing halves 30, 12 be connected when the force has reached a value between the maximum and minimum acceptable forces.

If the upper housing half 30 is to be loaded within the lower housing half 12 to a predetermined depth, it will be necessary to monitor the difference between the length of the planar edge section 40 of the upper housing half 30 and the length of the section 41 engaging the lower housing half 12. It should be noted that when the upper housing half 30 is being loaded to a desired depth, the perimetral ridge 20 formed in the lower housing half 12 can serve as a limit stop for loading the upper housing half 30 into the lower housing half 12. This is best illustrated in FIG. 4.

Referring now to FIGS. 5-8, the catalytic converter assembly 10 of the present invention is fabricated by supporting the lower housing half 12 and the monolith 50 and loading the upper housing half 30 within the lower housing half 12 to either a predetermined force or a predetermined depth of insertion by applying force to the perimetrally extending ridge 38 of the upper housing half 30. By loading the upper housing half 30 within the lower housing half 12 to either a predetermined force or a predetermined depth of insertion, the monolith 50 is contained in the housing 51 between the grooved portions 14, 32. Depending upon the measurement employed for fabricating the assembly 10, either the force being applied to the perimetrally extending ridge 38 of the upper housing half 30 or the depth to which the upper housing half 30 is loaded within the lower housing half 12 must be monitored. Once a predetermined force or depth has been reached, the upper housing half 30 is spot welded to the lower housing half 12 at points 60, 62, 64, and 66. Welds 60, 62, 64, 66 hold the upper housing half 30 in place with respect to the lower housing half 12 under the desired force or at the desired depth, while a metal inert gas (MIG) weld is applied completely around the assembly 10, as illustrated in FIG. 4. In one embodiment, the welds 60, 62, 63, and 66 have been applied utilizing a metal inert gas (MIG) welding system in an arc tack-welding process.

Figure 7:
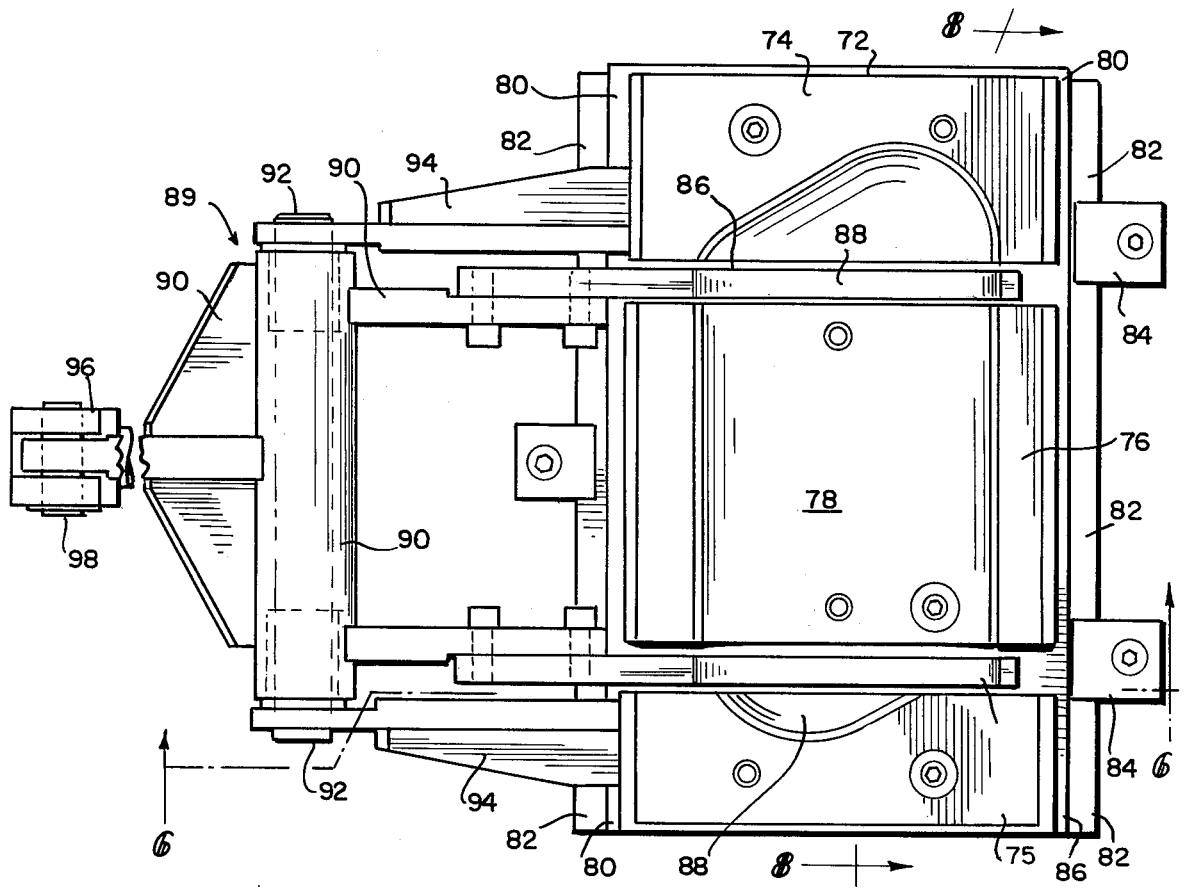
FIG. 7 is a sectional view of the apparatus of FIG. 6, taken generally along section lines 7—7 thereof.
Figure 8:
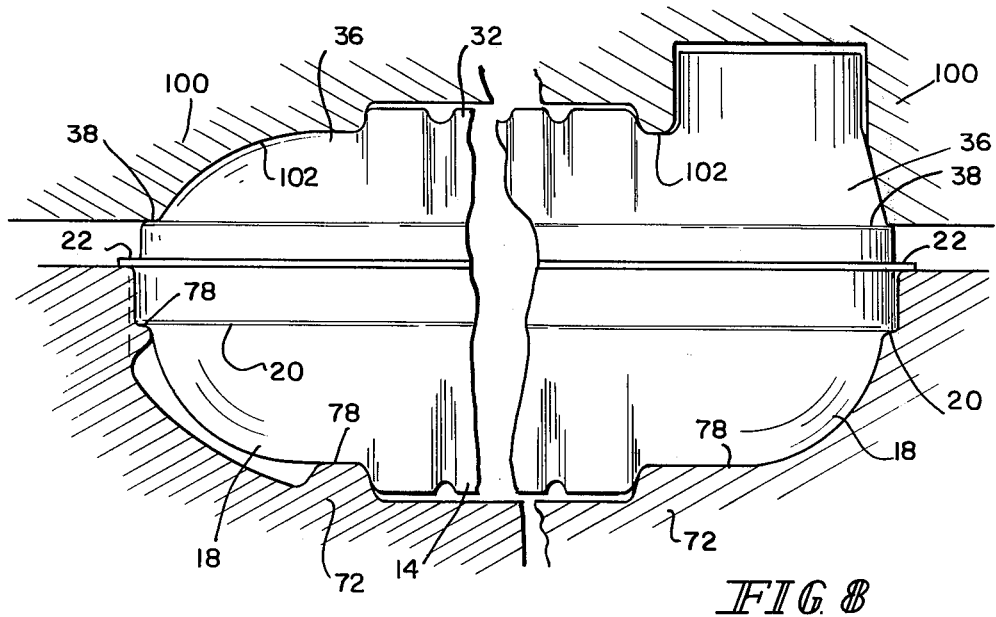
FIG. 8 is a sectional view, taken generally along section lines 8—8 of FIG. 7, of the assembly of FIG. 1 in the apparatus of FIGS. 6-7 for fabrication of the assembly of FIG. 1.

Referring more specifically to FIGS. 6-8, an apparatus 70 for fabricating the catalytic converter assembly 10 shown in FIGS. 1-5 in accordance with the steps described above includes a removable lower nesting block 72 within which the lower housing half 12 is supported during the fabrication process. The lower nesting block 72 is divided into two end sections 74, 75 and a center section 76 and is provided with surfaces forming a a cradle or nest 78 having a shape and dimensions generally conforming to the shape and dimensions of lower housing half 12. The lower nesting block 72 is positioned by a lower support bracket 80 having a base 82 which is mounted in a press 83 by base mounts 84. The lower nesting block 72 is divided by slots 85 provided for two fingers 86 having portions 87 formed to correspond to the shape and dimensions of the lower housing half 12.

The fingers 86 are coupled to a knock-out mechanism 89 which forces the fingers 86 upward upon completion of the tack-welding process to remove the tack-welded assembly 10 from the lower nesting block 72. The mechanism 89 for removing the tack-welded assembly 10 includes a pivot bracket 90 which supports the two fingers 86 and which is pivotally mounted by a shaft 92 from a support bracket 94 connected to the base 82. A lever 96 is pivotally connected by a shaft 98 to the pivot bracket 90. Lever 96 has associated with it a drive mechanism (not shown) for raising and lowering the fingers 86.

An upper nesting block 100, best illustrated in FIG. 6, includes a cradle or nest 102 for the upper housing half 30. The upper nesting block 100 is supported by an upper support bracket 104 having associated therewith a force-loading mechanism 106. The force-loading mechanism 106 includes a loading piston and cylinder mechanism 108 movably supporting a ram including plates 110, between which a load cell 111 is mounted. Reciprocating movement of the plates 110 moves the upper nesting block 100 upward and downward. A force gauge 120 is connected to the load cell 111. Gauge 120 is positioned relative to the apparatus 70 so that the operator of the apparatus 70 may continuously monitor the force being applied to the upper housing half 30. Four welding heads 122 (two of which are shown in FIG. 6) are adjustably positioned at appropriate angles with respect to the assembly 10 in order to weld the upper housing half 30 to the lower housing half 12 at points 60, 62, 64, 66 (FIG. 5) while force is maintained on the upper housing half 30 by the force-loading mechanism 106. Upper nesting block 100 has four channels 130 (FIG. 6) for accommodating the welding heads 122 and permitting them to be positioned with respect to the assembly 10 at the appropriate positions for the metal inert gas (MIG) welding process.

As best illustrated in FIG. 8, it is important to note the positions of the upper and lower nesting blocks 100 and 72, respectively, in relation to the upper and lower housing halves 30 and 12, respectively, during the fabrication process. The upper and lower cradles 102 and 78, respectively, are shaped so that forces are applied to the upper and lower housing halves 30, 12 along selected surfaces of the upper and lower housing halves 30, 12. Referring to FIG. 8, the lower housing half 12 is supported in the lower nesting block 72 by the perimetral lip 22, the perimetrally extending ridge 20, and surfaces of the ungrooved portions 18 of the housing half 12. The grooved portion 14 of the lower housing half 12 is supported away from the lower nesting block 72 so that no force is applied against the grooved portion 14. This minimizes the likelihood of force damage to the monolith supported within the grooved portion 14.

The upper housing half 30 is positioned in the lower housing half 12 when the upper nesting block 100 is in a retracted position. Prior to positioning the upper housing half 30 in the lower housing half 12, the lower housing half 12 and the monolith 50 will have been positioned within the lower nesting block 72. As illustrated in FIG. 8, the upper nesting block 100 engages the perimetral ridge 38 and ungrooved portions 36 of the upper housing half 30. The upper nesting block 100 does not contact the grooved portion 32 of the upper housing half 30, and therefore no force is applied by the upper nesting block 100 to the grooved portions 32. As force is applied to the upper housing half 30 by the mechanism 106, the force is directed to the perimetral ridge 38 and the various ungrooved portions 36 engaged by the upper nesting block 100. By compression-loading the upper housing half 30 within the lower housing half 12, the assembly 10 is fabricated in a process similar to the closing of a shoebox.

While the apparatus 70, as shown in FIGS. 6-8, has been described with the force-loading mechanism 106 associated with the upper support bracket 104, it is not intended that the apparatus 70 be limited to such location of the force-loading mechanism 106. In one embodiment of the apparatus 70, the loading piston and cylinder mechanism 108 have been located between the lower support bracket 80 and the press 83 so that force is applied from below the nesting blocks 72, 100 rather than from above. The plate 110 and load cell 111 are mounted as previously described; however, movement of the plates 110 is restricted. Accordingly, reciprocating movement of the lower support bracket 80 moves the lower nesting block 72 upward and downward. With the exception of these noted differences, the apparatus 70 is in general structurally the same as previously described.

In the operation of the other embodiment of apparatus 70, the upper housing half 30 is positioned in the lower housing half 12 when the lower nesting block 72 is in a retracted position. Prior to positioning the upper housing half 30 in the lower housing half 12, the lower housing half 12 and the monolith 50 will have been positioned within the lower nesting block 72. The nesting blocks 72, 100 engage the perimetral ridges and ungrooved portions of the housing halves 12, 30 in the same manner as previously described, and therefore no force is applied by the lower nesting block 72 to the grooved protions of the housing halves 12, 30. As force is applied to the lower housing half 12 by the mechanism 108, the force is directed to the perimetral ridge and various ungrooved portions engaged by the nesting blocks 72, 100 to compression-load the upper housing half 30 within the lower housing half 12.

What is claimed is:

1. A catalytic converter assembly comprising a housing and a catalyst-supporting substrate contained by the housing, the housing including first and second housing portions spaced apart along a longitudinal plane thereof, the first housing portion having a perimetral ridge formed substantially completely around the first housing portion in parallel to the longitudinal plane for uniformly supporting the first housing portion during fabrication of the assembly, the first housing portion terminating at a perimetral lip region, and the second housing portion having a perimetral region for insertion into engagement in the first housing porton lip region, the second housing portion further including a perimetral ridge formed substantially completely around the second housing portion in parallel to the longitudinal plane for uniformly compression-loading the perimetral insertion region of the second housing portion into the perimetral lip region of the first housing portion perpendicular to the longitudinal plane to a value within a predetermined range of values of a desired parameter.

2. A catalytic converter assembly, comprising a housing and a catalyst-supporting substrate contained by the housing, the housing including first and second longitudinally spaced-apart housing portions between which the substrate is captured, the first housing portion including an outwardly projecting perimetral edge, a perimetral ridge formed substantially completely around the first housing portion slightly below the perimetral edge for uniformly supporting the first housing portion during fabrication of the assembly, and a perimetral lip region formed between the ridge and edge, and the second housing portion including a downwardly projecting perimetral edge having a planar region for insertion into engagement in the first housing portion lip region, and a perimetral ridge formed substantially completely around the second housing porton slightly above the perimetral edge for uniformly compression-loading the second housing portion planar region into the first housing portion lip region to a value within a predetermined range of values of a desired parameter, the first housing portion lip region and the second housing portion planar region forming a perimetral crevice and surface adjacent the edge of the first housing portion for retaining a weld deposit for connecting the housing portions.

3. The assembly as recited in claim 2 wherein the first and second housing portions each further include ungrooved end sections and a grooved intermediate section separating the ungrooved sections, the grooved sections being formed circumferentially of the first and second housing portions and coinciding in alignment when the housing portions are connected.

4. The assembly as recited in claim 3 wherein the substrate is positioned between the grooved sections of the housing portions and is surrounded with a support sleeve for engaging the grooved sections and absorbing some of the loading pressure.

5. A catalytic converter assembly, comprising a housing and a catalyst-supporting substrate contained by the housing, the housing including first and second longitudinally spaced-apart housing portions between which the substrate is captured, the first housing portion including an outwardly projecting perimetral edge, a perimetral ridge formed substantially completely around the first housing portion slightly below the perimetral edge for uniformly supporting the first housing portion during fabrication of the assembly, a perimetral lip region formed between the ridge and edge, ungrooved end sections provided adjacent to the ridge, and a grooved intermediate section separating the ungrooved sections, the second housing portion including a downwardly projecting perimetral edge having a planar region for insertion into engagement in the first housing portion lip region, a perimetral ridge formed substantially completely around the second housing portion slightly above the perimetral edge for uniformly compression-loading the second housing portion planar region into the first housing portion lip region to a value within a predetermined range of values of a desired parameter, ungrooved end sections provided adjacent the ridge, and a grooved intermediate section separating the ungrooved sections, the grooved sections being formed circumferentially of the housing portions and coinciding in alignment when the second housing portion planar region is compression-loaded into the first housing portion lip region, the first housing portion lip region and the second housing portion planar region forming a perimetral crevice and surface adjacent the edge of the first housing portion for retaining a weld deposit for connecting the housing portions.

* * * * *

UNITED STATES PATENT AND TRADEMARK OFFICE
CERTIFICATE OF CORRECTION

PATENT NO. : 4,322,388
DATED : March 30, 1982
INVENTOR(S) : Leonard J. Hardin et al It is certified that error appears in the above-identified patent and that said Letters Patent is hereby corrected as shown below:

Column 2, line 11, change "1-3" to --1-2--.

Column 5, line 7, change "63" to --64--.

Column 5, line 17, change "forming a a cradle" to --forming a cradle--.

Column 7, line 9 (claim 1), change "porton" to --portion--.

Column 7, line 33 (claim 2), change "porton" to --portion--.

Signed and Sealed this

Twenty-first Day of September 1982

[SEAL]

Attest:

GERALD J. MOSSINGHOFF

Attesting Officer

Commissioner of Patents and Trademarks